United States Patent
Shimizu et al.

[19]

[11] Patent Number: 5,957,232
[45] Date of Patent: Sep. 28, 1999

[54] AUTOMATIC STEERING SYSTEM FOR VEHICLE

[75] Inventors: Yasuo Shimizu; Katsuhiro Sakai, both of Wako, Japan

[73] Assignee: Honda Giken Kogyo Kabushiki Kaisha, Tokyo, Japan

[21] Appl. No.: 09/059,382

[22] Filed: Apr. 14, 1998

[30] Foreign Application Priority Data

Apr. 15, 1997 [JP] Japan ................................ 9-097604

[51] Int. Cl.⁶ .................................................. B62D 1/00
[52] U.S. Cl. ........................................ 180/204; 180/446
[58] Field of Search ................................ 180/204, 446, 180/167, 168, 169; 701/23, 25, 41

[56] References Cited

U.S. PATENT DOCUMENTS

| | | | |
|---|---|---|---|
| 4,735,274 | 4/1988 | Good et al. | 180/204 |
| 4,931,930 | 6/1990 | Shyu et al. | 180/204 |
| 5,742,141 | 4/1998 | Czekaj | 180/204 |
| 5,764,015 | 6/1998 | Shimizu et al. | 318/587 |

FOREIGN PATENT DOCUMENTS

| | | |
|---|---|---|
| 61-263851 | 5/1985 | Japan ............................ 701/41 |
| 3-74256 | 3/1991 | Japan . |
| 4-55168 | 2/1992 | Japan . |

*Primary Examiner*—Kevin Hurley
*Assistant Examiner*—William Zimmerli
*Attorney, Agent, or Firm*—Nikaido, Marmelstein, Murray & Oram, LLP.

[57] ABSTRACT

An automatic steering system having misoperation prevention is provided. The system includes a mode selecting switch operated by a driver having four switches for selecting any of four parking modes. If the driver pushes the switch for a desired parking mode, the switch is turned on or lit for 5 seconds. If the driver, having confirmed whether the selected parking mode is wrong or not, pushes an automatic parking start switch in the course of such period, automatic parking control is started. When the automatic parking start switch is not pushed while the switch is lit, or when the vehicle is moved by the driver to conduct the spontaneous parking, the switch is turned off to cancel the automatic parking control.

9 Claims, 3 Drawing Sheets

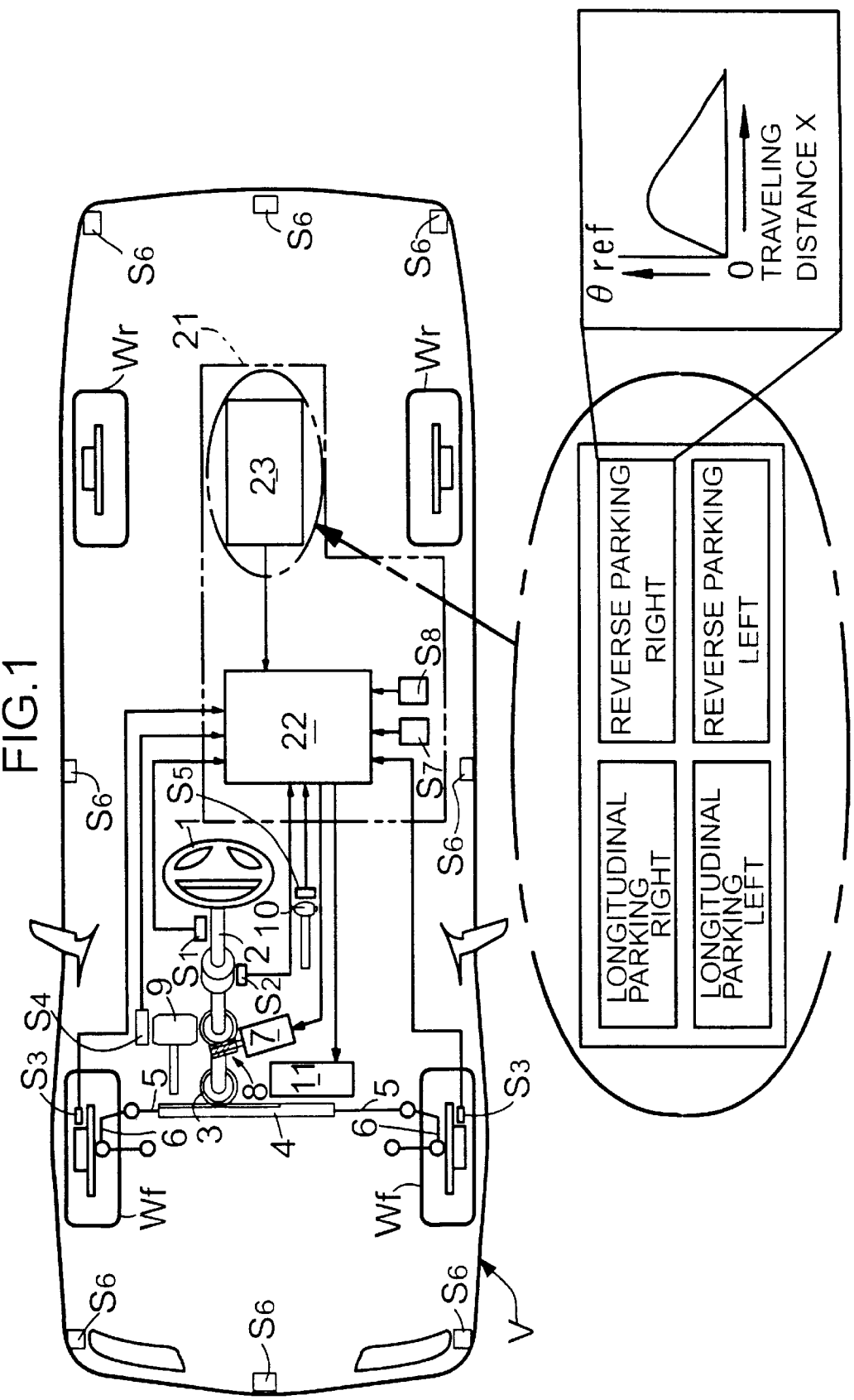

AUTOMATIC STEERING SYSTEM FOR VEHICLE

BACKGROUND OF THE INVENTION

1. Field of the Invention

The present invention relates to an automatic steering system for a vehicle for automatically parking the vehicle without recourse to steering by a driver.

2. Description of the Prior Art

Automatic steering systems for vehicles are already known from Japanese Patent Application Laid-Open Nos. 3-74256 and 4-55168. These automatic steering systems for vehicles utilize an actuator for the conventionally well-known electric power steering system, and are designed so that reverse parking or longitudinal parking is automatically performed by controlling the actuator based on a relationship between the traveling distance of the vehicle and the steering angle which are stored in advance.

In the system described in the above-described Japanese Patent Application Laid-Open No. 4-55168, if the driver operates a garaging switch or a longitudinal parking switch, the steering is switched to an automatic steering mode when the vehicle is in a stopped state and the driver is not operating the steering wheel, and if the driver operates a power steering switch during automatic steering, the automatic steering mode is ended and steering is restored to a power steering mode.

In this automatic steering system, when the driver has operated the longitudinal parking switch by mistake to indicate the garaging of the vehicle, even if the garaging switch is operated again, the control unit conducts a predetermined processing to start the automatic steering for longitudinal parking. For this reason, there is a problem that the operation for again starting the automatic steering for the garaging of the vehicle is troublesome, and the operability is poor. Further, when the longitudinal parking switch or the power steering switch is operated by mistake during automatic steering, for example, during the garaging of the vehicle, the steering is restored to the power steering mode and hence, if the driver does not notice this fact, there is a possibility that the vehicle is moved in an unintended direction.

SUMMARY OF THE INVENTION

The present invention has been accomplished with the above circumstance in view, and it is an object of the present invention to prevent misoperation n operating an automatic steering system.

To achieve the above object, there is provided an automatic steering system for a vehicle, comprising a movement locus setting means for storing or calculating a locus of movement of a vehicle to a plurality of target positions, a selecting means for selecting the locus of movement to any of the target positions, an actuator adapted to steer wheels of the vehicle and a control means coupled to the actuator for controlling the driving of the actuator based on the selected locus of movement during movement of the vehicle from a start position to the target position. The automatic steering system further includes a start means coupled to the control means for starting the control of the actuator based on the selected locus of movement after selection of the locus of movement by the selecting means.

With the above arrangement, even if the locus of movement to any of the target positions is selected by the selecting means, the movement of the vehicle based on the selected locus of movement is not started until the start means is operated. Therefore, even if the wrong locus of movement is selected by the selecting means, there is sufficient time for the driver to correct the selection of the wrong locus of movement. Moreover, even if only one of the selecting means and the start means is operated, the control of the actuator is not started and therefore, it is possible to prevent misoperation.

The locus of movement of the vehicle is set in the form of a steering angle of the wheels with respect to the traveling distance of the vehicle. Thus, even if the speed of movement of the vehicle is varied, a constant locus of movement can be ensured.

The automatic steering system further includes a brake input means operated by a driver, and the control of the actuator based on the locus of movement, is permitted on a condition that the brake input means is being operated. When the vehicle has been moved to closer to an obstacle, the brake input means can be immediately operated to stop the vehicle.

A When the start means is not operated for a predetermined time after selection of the locus of movement by the selecting means, the selection by the selecting means is canceled. If the predetermined time is lapsed in stopping the automatic steering control after selection of the locus of movement by the selecting means, the selection by the selecting means is canceled. Therefore, a special canceling operation is not required, thereby enhancing the operability and preventing the misoperation. The predetermined time is sufficient for the driver to confirm whether the locus of movement selected by the driver is correct or not. In the embodiment, the predetermined time is set at 5 seconds, but is not limited thereto.

When the vehicle has been moved after selection of the locus of movement by the selecting means and before operation of the start means, the selection by the selecting means is canceled. Thus, when the vehicle has been moved spontaneously by the driver in stopping the automatic steering control after selection of the locus of movement by the selecting means, the selection by the selecting means is canceled. Therefore, special canceling operation is not required, thereby enhancing the operability and preventing the misoperation.

The movement of the vehicle is through a predetermined distance or more. Thus, the selection by the selecting means can be canceled with the driver's will being sufficiently confirmed. The predetermined distance is a distance such that it can be confirmed that the driver has moved the vehicle by his own will. In the preferred embodiment, the predetermined distance is set at 50 cm, but is not limited thereto.

The selection of the locus of movement is prohibited during control of the actuator based on a selected locus of movement. Therefore, even if the selecting means is operated accidentally or by mistake during control of the actuator based on the selected locus of movement, the locus of movement can be prevented from being changed, and the automatic steering control can be continued.

The operation for canceling the start means is permitted when the vehicle is in a substantially stopped state, during control of the actuator based on the selected locus of movement. Thus, even if the selecting means is operated accidentally or by mistake during control of the actuator based on the selected locus of movement, it is possible to prevent the vehicle from falling into a "no hands" driven state as a result of discontinuation of the control of the actuator. The term "substantially stopped state of the vehicle" includes a state in which the vehicle is being moved at an extremely low speed (1 km/hr in the preferred embodiment) such that the vehicle can be immediately stopped, in addition to a state in which the vehicle has been completely stopped.

At least one of the selecting means and the start means is mounted at a location in which only the driver can operate it. Therefore, it is possible to prevent the operation of the selecting means or the start indicating means by a mischievous operation provided by a child in the vehicle, for example.

BRIEF DESCRIPTION OF THE DRAWINGS

FIG. 1 is an illustration of the entire arrangement of a vehicle equipped with a steering control unit according to an embodiment of the present invention.

DETAILED DESCRIPTION OF THE PREFERRED EMBODIMENT

Figure 2A:
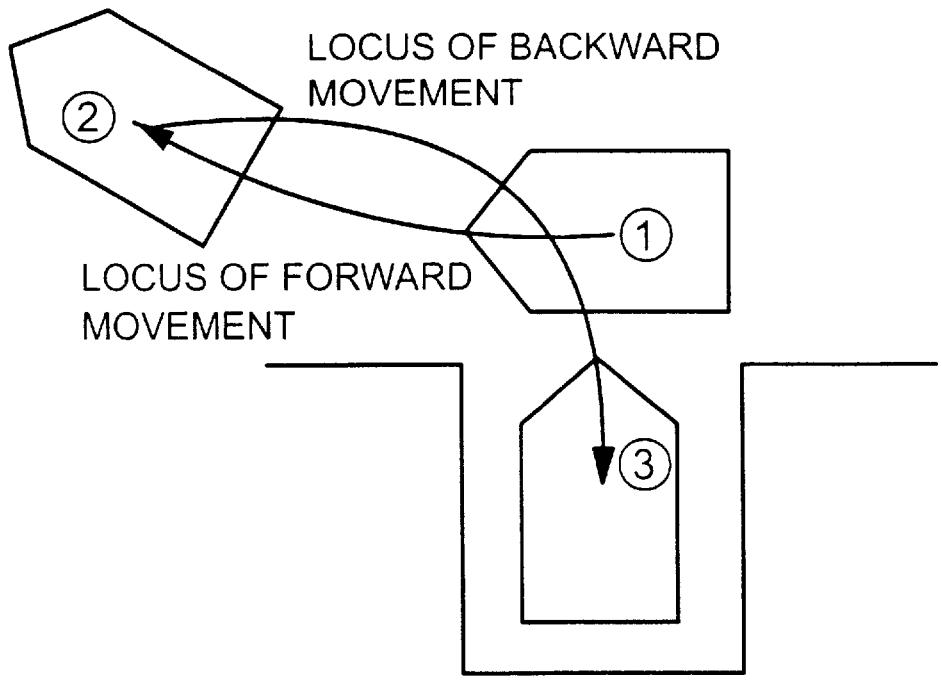
FIGS. 2A and 2B are illustrations for explaining the operation in a reverse parking/left mode.

As shown in FIG. 1, a vehicle V includes a pair of front wheels Wf, Wf and a pair of rear wheels Wr, Wr. A steering wheel 1 and the front wheels Wf, Wf which are the steered wheels are interconnected by a steering shaft 2 rotated in unison with the steering wheel 1. A pinion 3 is provided at a lower end of the steering shaft 2, a rack 4 is meshed with the pinion 3, left and right tie rods 5 are provided at opposite ends of the rack 4, and left and right knuckles 6 are connected to the tie rods 5. A steering actuator 7 having an electric motor, is connected to the steering shaft 2 through a worm gear mechanism 8, to assist in the operation of the steering wheel 1 by a driver, or to conduct automatic steering for garaging of the vehicle which will be described hereinafter.

A steering control unit 21 is comprised of a controller 22 and a storage means 23. Input to the controller 22 are signals from a steering angle detecting means $S_1$ for detecting the steering angle θ of the front wheels Wf, Wf based on the rotational angle of the steering wheel 1, a steering torque detecting means $S_2$ for detecting the steering torque of the steering wheel 1, front wheel rotational angle detecting means $S_3$, $S_3$ for detecting rotational angles of the left and right front wheels Wf, Wf, a brake operational amount detecting means $S_4$ for detecting the operational amount of a brake pedal 9 which is a brake input means, a shift range detecting means $S_5$ for detecting the shift range selected by a select lever 10 (a "D" range, an "R" range, an "N" range, a "P" range or the like), and eight object detecting means $S_6$ mounted at a front portion, a central portion and a rear portion of the vehicle V. The object detecting means $S_6$ may be of any known type, such as sonar, radar, television camera or the like. Lines connecting the eight object detecting means $S_6$ and the controller 22 are omitted from the drawings for the purpose of preventing complication of the drawings. The controller 22 constitutes the control means of the embodiment of the present invention, and the storage means 23 constitutes the movement locus setting means of the embodiment of the present invention.

Figure 3:
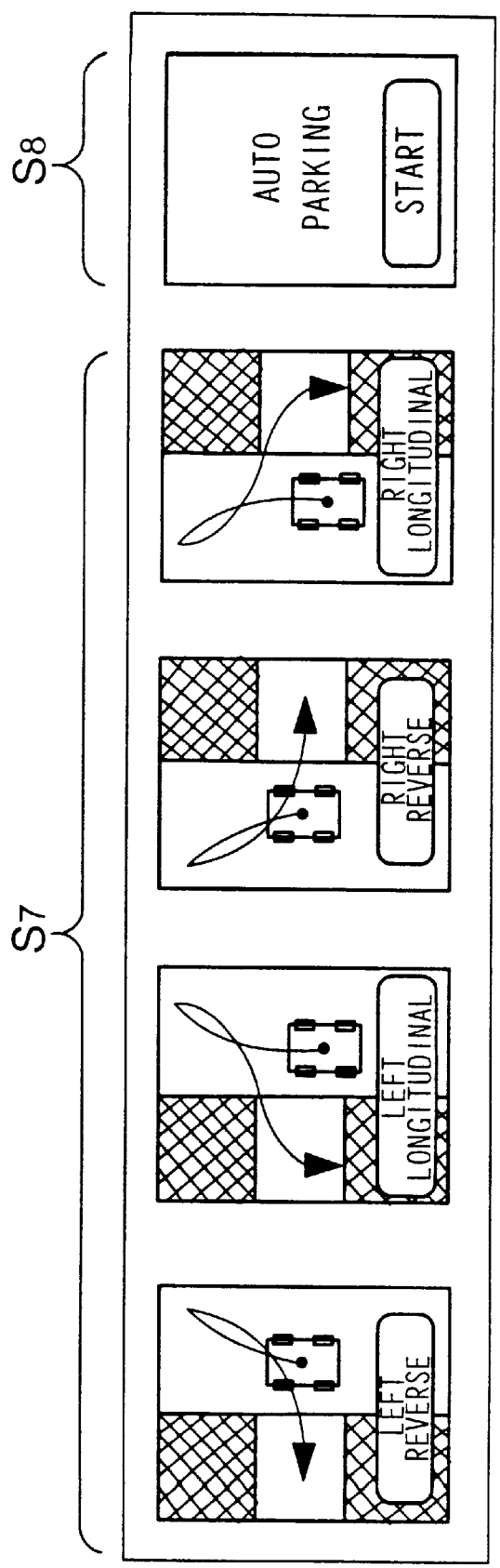
FIG. 3 is an illustration of a mode selecting switch and automatic parking start switch according to the embodiment of the present invention.

As can be seen with reference to FIG. 3, a mode selecting switch $S_7$ and an automatic parking start switch $S_8$ operated by the driver, are connected to the controller 22. The mode selecting switch $S_7$ includes four buttons which are operated to select any of four parking modes: a reverse-parking/right mode, a reverse-parking/left mode, a longitudinal parking/right mode, and a longitudinal parking/left mode. The automatic parking start switch $S_8$ is operated to start automatic parking in any mode selected by the mode selecting switch $S_7$. The mode selecting switch $S_7$ and the automatic parking start switch $S_8$ are mounted at locations where an occupant other than the driver, cannot operate them, e.g., at a right end of an instrument panel or on a door located on the right of the driver in a right-hand drive vehicle. The mode selecting switch $S_7$ is the selecting means of the embodiment of the present invention, and the automatic parking start switch $S_8$ is the start indicating means of the embodiment of the present invention.

Data for the four parking modes, i.e., relationships of standard steering angles Oref to traveling distance X of the vehicle V are previously stored as a table in the storage means 23. The traveling distance X of the vehicle V is calculated by multiplying the known peripheral length of the front wheel Wf by the rotational angle of the front wheel Wf detected by the front wheel rotational-angle detecting means $S_3$. Either of a high-select value or a low-select value output from the pair of left and right front wheel rotational-angle detecting means $S_3$, $S_3$, and an average value of the high-select value and the low-select value is used for the calculation of the traveling distance.

The controller 22 controls the operation of the steering actuator 7 and the operation of an operational stage display device 11 which includes a liquid crystal monitor, a speaker, a lamp, a chime, a buzzer or the like, based on the signals from the detecting means $S_1$ to $S_6$ and the switches $S_7$ and $S_8$, and the data for the parking modes stored in the storage means 23.

The operation of the embodiment of the present invention having the above-described arrangement will be described below.

When the vehicle is in a normal state in which automatic parking is not carried out (when mode selecting switch $S_7$ is not operated), the steering control unit 21 functions as a regular power-steering control unit. More specifically, when the steering wheel 1 is operated by the driver to turn the vehicle V, the steering torque detecting means $S_2$ detects the steering torque input to the steering wheel 1, and an actuator-driving control means 22b controls the driving of the steering actuator 7 based on the steering torque. As a result, the left and right front wheels Wf, Wf are steered by the driving force from the steering actuator 7, whereby the steering operation provided by the driver is assisted.

The contents of an automatic parking control will be described with the reverse parking/left mode (the mode in which the parking is conducted while the vehicle is being moved backwards to a parking position lying on the left side of the vehicle V) taken as an example.

First, as shown in FIG. 2A, the vehicle V is moved close to a garage where the vehicle V is to be parked by a steering operation provided by the driver himself, and in a state in which the left side of the vehicle body is located as close as possible to an inlet line of the garage, the vehicle V is stopped at a position (a start position (1)) at which a predetermined reference point (e.g., a left sideview mirror) is matched with a center line of the garage. When the mode selecting switch $S_7$, which corresponds to the reverse parking/left mode, is pushed down to indicate the automatic parking in the reverse parking/left mode, the bottom portion is lit or turned on, and the speaker of the operational stage display device 11 notifies the driver of "left reverse parking". At this time, if the driver notices that he has pushed down the switch for the wrong mode, this switch is turned off by pushing the switch down again. Therefore, the driver may then push the correct switch.

If the automatic parking start switch $S_8$ is not operated until a predetermined time (e.g., 5 seconds) has lapsed from the pushing-down of the mode selecting switch $S_7$ which corresponds to the reverse parking/left mode, or if the vehicle has been moved through a predetermined distance (e.g., 50 cm), before the automatic parking start switch $S_8$ is operated, then the turned-on switch corresponding to the reverse parking/left mode is turned off, after the speaker of the operational stage display device 11 notifies the driver of "the automatic parking is canceled". Therefore, when the driver changes his mind and intends to discontinue the automatic parking after he has pushed the pre-selected selecting switch $S_7$, the automatic parking can be canceled only by waiting for the lapse of the predetermined time without carrying out a special canceling operation, or only by moving the vehicle to start spontaneous parking. This leads to improved convenience in operating the automatic steering. If the traveling distance of the vehicle V is shorter than a predetermined distance, the automatic parking is not canceled. Therefore, when the driver has loosened the brake pedal 9 to permit the slight movement or creeping of the vehicle, the automatic parking is not canceled.

When the automatic parking start switch $S_8$ is pushed down in a state in which any of the mode selecting switches $S_7$ are in a turned-on state, the automatic parking start switch $S_8$ is turned on to start the automatic parking control, and the speaker of the operational stage display device 11 notifies the driver of "slowly move the vehicle forwards". In a state in which the automatic parking control is being conducted, the current position of the vehicle, a surrounding obstacle, the parking position, an assumed locus of movement of the vehicle from the start position to the parking position, the reversing position for switch-over from forward movement to backward movement and the like are indicated on the operational stage display device 11, and in addition to this, various instructions and warnings are emitted by voice from the speaker to the driver. During the automatic parking control, only when the brake pedal 9 is loosened by the driver to perform creep travel of the vehicle V, are the front wheels Wf, Wf automatically steered based on the data for the reverse parking/left mode selected by the mode selecting switch $S_7$, even if the steering wheel 1 is not operated. In this way, the execution of automatic parking control is permitted when the driver has operated the brake pedal 9 to conduct creep travel of the vehicle V and therefore, when the driver finds out about an obstacle, he can immediately depress the brake pedal 9 to stop the vehicle V.

If the driver pushes any of the mode selecting switches $S_7$ to select a desired mode, and then pushes the automatic parking start switch $S_8$ after checking the fact that the selected mode is not wrong, the automatic parking control is started. Therefore, even if the driver pushes the switch for the wrong mode, there is sufficient time for the driver to correct the wrong switch, and moreover, it is possible to reliably prevent the occurrence of a misoperation.

While the vehicle V is moved forwards from the start position (1) to the reversing position (2) by the automatic parking control, the front wheels Wf, Wf are automatically steered to the right. When the vehicle V has reached the reversing position (2), the speaker of the operational stage display device 11 notifies the driver to "stop the vehicle and carry out the shift change". When the driver has performed the shift change, the speaker notifies the driver to "slowly move the vehicle backwards". While the vehicle is being moved from the reversing position (2) to the target position (3), the front wheels Wf, Wf are automatically steered to the left. When the vehicle has reached the target position (3), the speaker of the operational stage display device 11 notifies the driver that "the left reverse parking is completed, and stop the vehicle", thereby completing the automatic parking control.

Figure 2B:
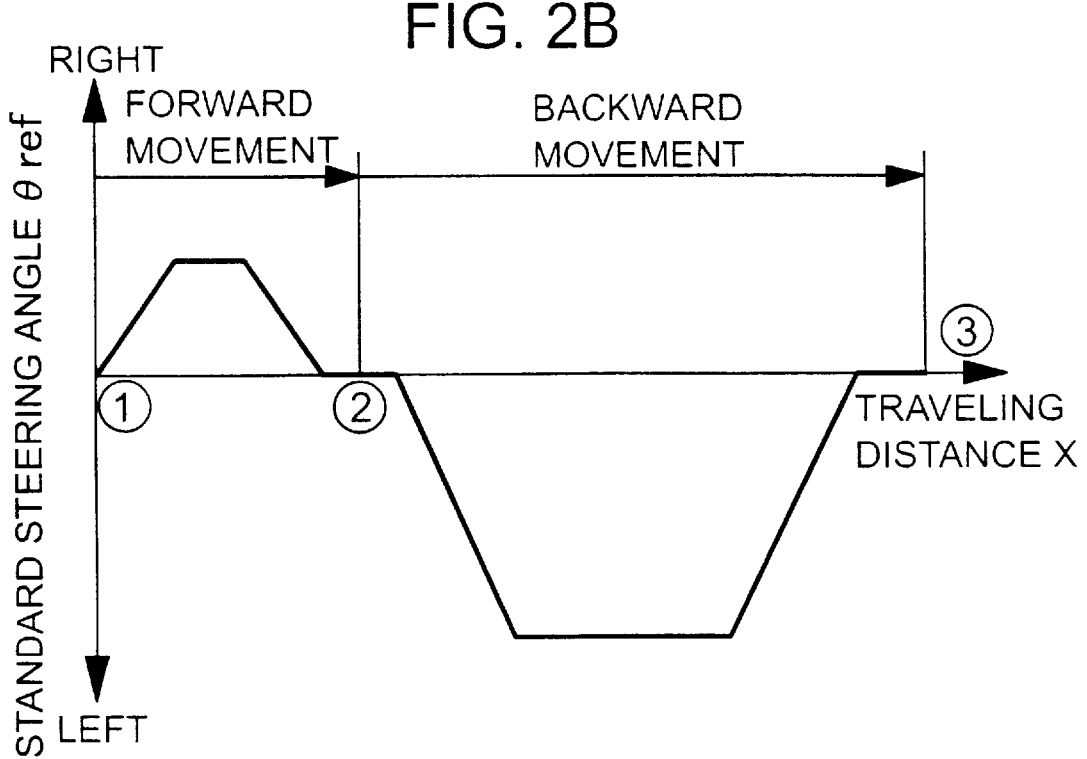

As can be seen from FIG. 2B, while the automatic steering is being carried out, the controller 22 calculates a deviation $E=\theta ref-\theta$ based on a standard steering angle $\theta$ ref in the reverse parking/left mode read out from the storage means 23 and the steering angle $\theta$ input from the steering angle detecting means $S_1$, and controls the operation of the steering actuator 7, so that the deviation E is equal to 0. At this time, data of the standard steering angle $\theta$ref is set in correspondence to the traveling distance X of the vehicle V and hence, even if there is a variation in vehicle speed in the creep travel, the vehicle V is always moved on the locus of movement.

Even if the automatic parking start switch $S_8$ is pushed again by mistake during execution of the automatic parking control, the operation is neglected, if the vehicle V is not in a stopped state at that time. Therefore, there is no possibility that automatic parking control is ended against a driver's intention, causing the vehicle V to fall into a "no-hands" driven state. In addition, even if the mode selecting switch $S_7$ is operated by mistake during execution of automatic parking control, such operation is neglected. Therefore, there is no possibility that the mode of the automatic parking control is switched against a driver's intention, causing the vehicle V to be moved in an unintended direction.

The above-described automatic parking control is canceled when the driver pushes the automatic parking start switch $S_8$ for the second time in a state in which the vehicle V has been stopped. In addition to this case, when the driver loosens the brake pedal 9 too much, causing the vehicle speed to exceed the maximum speed (e.g., 5 km/hr) suitable for the automatic parking control,or when the driver operates the steering wheel 1, or when any of the object detecting means $S_6$ detects an obstacle, the automatic parking control is canceled and restored to the normal power-steering control.

For example, the locus of movement of the vehicle V to the target position is previously stored in the storage means 23 in the embodiment, but the locus of movement can be also calculated from the current position and the target position of the vehicle V. As discussed above, the automatic steering system includes the start indicating means for starting the control of the actuator based on the selected locus of movement after selection of the locus of movement by the selecting means. Therefore, even if the wrong locus of movement is selected by the selecting means, there is sufficient time for the driver to correct the selection of the wrong locus of movement. Moreover, even if only one of the selecting means and the start indicating means is operated, the control of the actuator is not started and therefore, it is possible to prevent the misoperation.

The locus of movement of the vehicle is set in the form of the steering angle of the vehicle wheel with respect to the traveling distance of the vehicle. Therefore, even if the speed of movement of the vehicle is varied, a constant locus of movement can be ensured.

The automatic steering system includes the brake input means operated by a driver, and the control of the actuator based on the locus of movement is permitted on a condition that the brake input means is being operated. Therefore, when the vehicle has moved closer to an obstacle, the brake input means can be immediately operated to stop the vehicle.

When the start indicating means is not operated for a predetermined time after selection of the locus of movement by the selecting means, the selection by the selecting means is canceled. Therefore, to stop automatic steering control after selection of the locus of movement by the selecting means, a special canceling operation is not required, thereby enhancing the operability and preventing the misoperation.

When the vehicle has been moved after selection of the locus of movement by the selecting means and before operation of the start indicating means, the selection by the selecting means is canceled. Therefore, to stop automatic steering control after selection of the locus of movement by the selecting means, a special canceling operation is not required, thereby enhancing the operability and preventing the misoperation.

When the vehicle is moved through the predetermined distance or more, the selection by the selecting means can be canceled. The driver's intention thereby being sufficiently confirmed.

The selection of the locus of movement is prohibited during control of the actuator based on an already selected locus of movement. Therefore, even if the selecting means is operated accidentally or by mistake during control of the actuator based on an already selected locus of movement, the locus of movement can be prevented from being changed, and the automatic steering control can be continued.

The canceling of the start indicating means is permitted when the vehicle is in the substantially stopped state, during control of the actuator based on the selected locus of movement. Therefore, even if the selecting means is operated accidentally or by mistake during control of the actuator based on the selected locus of movement, it is possible to prevent the vehicle from falling into a "no hands" driven state as a result of discontinuation of the control of the actuator.

At least one of the selecting means and the start indicating means is mounted at a location in which only the driver can operate it. Therefore, it is possible to prevent the operation of the selecting means or the start indicating means by mischievous operation provided by a child in the vehicle.

Although the above embodiment has been described in detail, it will be understood that the present invention is not limited to the above-described embodiment, and various modifications in design may be made without departing from the subject matter of the present invention.

We claim:
1. An automatic steering system for a vehicle, comprising:
  a movement locus setting means for storing loci of movement of a vehicle for a plurality of target positions,
  a selecting means for selecting one locus of movement for one of the target positions,
  an actuator adapted to steer wheels of the vehicle,
  a control means coupled to the actuator for controlling the driving of the actuator based on the selected locus of movement, during movement of the vehicle from a start position to the target position, and
  a start means coupled to the control means for starting the control of the actuator based on the selected locus of movement after selection of the locus of movement by the selecting means.
2. An automatic steering system for a vehicle according to claim 1, wherein the locus of movement of the vehicle is defined by the steering angle of the wheels with respect to the traveling distance of the vehicle.
3. An automatic steering system for a vehicle according to claim 1 or 2, further including a brake input means operated by a driver, and wherein control of the actuator based on the locus of movement is permitted only when the brake input means is being operated.
4. An automatic steering system for a vehicle according to claim 1 or 2, wherein when the start means is not operated for a predetermined time after selection of the locus of movement by said selecting means, the selection by the selecting means is canceled.
5. An automatic steering system for a vehicle according to claim 1 or 2, wherein when the vehicle has moved after selection of the locus of movement by the selecting means and before operation of the start means, the selection by the selecting means is canceled.
6. An automatic steering system for a vehicle according to claim 5, wherein the movement of the vehicle is through at least a predetermined distance.
7. An automatic steering system for a vehicle according to claim 1 or 2, wherein the selection of the locus of movement by the selecting means is prohibited during control of the actuator based on an already selected locus of movement.
8. An automatic steering system for a vehicle according to claim 1 or 2, wherein the operation for canceling the start means is permitted when the vehicle is in a stopped state, during control of the actuator based on the selected locus of movement.
9. An automatic steering system for a vehicle according to claim 1, wherein at least one of the selecting means and the start means is mounted at a location where only the driver can operate it.

* * * * *